(12) United States Patent
Liu

(10) Patent No.: US 6,303,903 B1
(45) Date of Patent: Oct. 16, 2001

(54) METHOD AND APPARATUS FOR DETERMINING FOCUS POSITION OF A LASER

(75) Inventor: Xinbing Liu, Acton, MA (US)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/372,121

(22) Filed: Aug. 11, 1999

(51) Int. Cl.⁷ .................................................. B23K 26/02
(52) U.S. Cl. ............... 219/121.83; 219/121.82; 219/121.6; 219/121.75; 219/121.73; 219/121.74
(58) Field of Search .................... 219/121.83, 121.82, 219/121.6, 121.75, 121.73, 121.74

(56) References Cited

U.S. PATENT DOCUMENTS 5,744,780 * 4/1998 Chang et al. .................... 219/121.73
6,057,525 * 5/2000 Chang et al. .................... 219/121.73

* cited by examiner

Primary Examiner—M. Alexandra Elve
(74) Attorney, Agent, or Firm—Ratner & Prestia

(57) ABSTRACT

A method and apparatus for positioning a surface of a workpiece for laser machining. A laser beam is focused to a focal point to form a plasma generating a plasma emission. An imaging system is oriented to receive the plasma emission and generate a plasma image. The imaging system is adjusted to focus the plasma image and is then fixed. The laser is then diverted away from the focal point and an illumination source is activated to illuminate the surface of the workpiece. The imaging system generates an image of the surface of the workpiece. The workpiece is adjusted in position toward the focal point until the image of the surface of the workpiece is in focus.

20 Claims, 1 Drawing Sheet

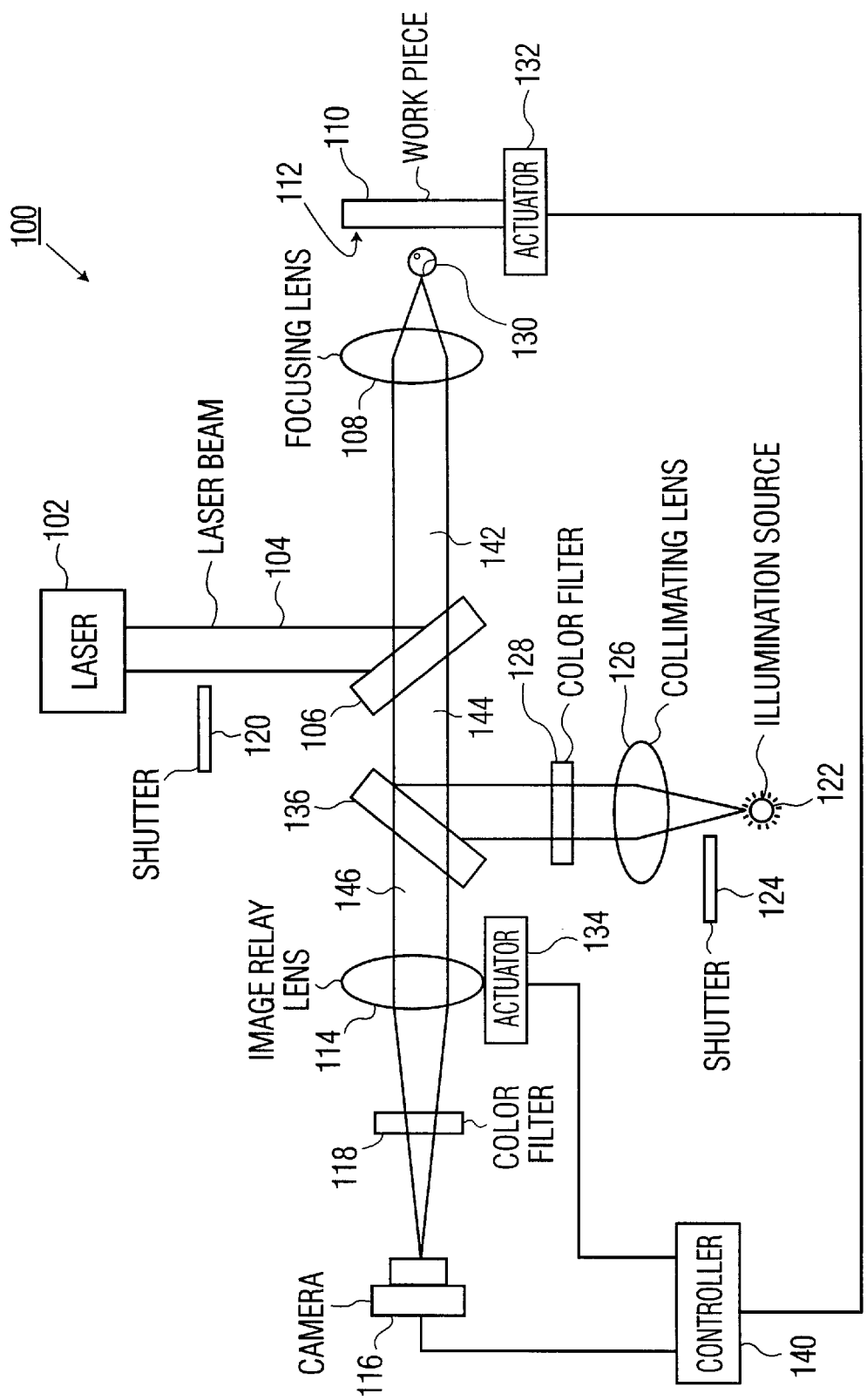

METHOD AND APPARATUS FOR DETERMINING FOCUS POSITION OF A LASER

FIELD OF THE INVENTION

This invention relates to positioning a surface of a workpiece for laser machining and, in particular, to using a an emission from a plasma formed by a laser to adjust the position of the surface of the workpiece.

BACKGROUND OF THE INVENTION

Lasers are scanned for a variety of purposes including drilling holes in or otherwise machining a workpiece. For example, a laser may be used to machine glass or silicon wafers to form waveguides or microoptical structures. Laser machining is often performed by focusing a laser beam to a focal point. The focal point is a point of heightened power density which may advantageously be used for machining a workpiece. In order to use the focal point for precise machining applications, it may be necessary to precisely position the workpiece relative to the location of the focal point.

Ultrafast lasers with pulse duration in the picosecond range and femtosecond range may be used for machining a workpiece. Ultrafast lasers may be used for precise ablation with little or no heat affected zone. They are especially suited for machining microscopic features in delicate materials such as thin films and brittle ceramics, which are otherwise difficult to machine. Because of their small effective work area, however, the focal point of ultrafast lasers are desirably accurately positioned relative to the workpiece.

The exact location of the focal point of a focused laser may be difficult to ascertain, however, due to deviations in the optical path. These deviations may be caused by abnormalities in mirrors used to direct the laser beam and in the focusing lens and by variations in the operating characteristics of the laser source. Thus, it is desirable to accurately adjust the position of the focal point with respect to the workpiece independent of variations in the laser source and the optical path.

SUMMARY OF THE INVENTION

The present invention provides a method and apparatus for positioning a surface of a workpiece for laser machining. A laser beam is focused to a focal point to form a plasma generating a plasma emission. The position of the focal point is determined and the surface of the workpiece is then moved to the focal point.

According to an aspect of the present invention, the laser beam is diverted away from the focal point before the surface is moved to the focal point.

According to another aspect of the present invention, an imaging system is oriented to receive the plasma emission and generate a plasma image, the imaging system is adjusted to focus the plasma image, the workpiece is positioned for an image of the surface of the workpiece to be directed to the imaging system to generate a workpiece surface image, and the workpiece is actuated to focus the image of the surface of the workpiece.

According to another aspect of the present invention, the laser beam is an ultrashort pulse laser beam.

According to another aspect of the present invention, the plasma emission is filtered to narrow the spectral bandwidth of the plasma image.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing is the following figure:

the FIGURE illustrates an apparatus for positioning a surface of a workpiece for laser machining according to an exemplary embodiment of the present invention.

DETAILED DESCRIPTION OF THE INVENTION

Referring now to the drawing, in which like reference numerals refer to like elements throughout, the FIGURE shows an apparatus 100 for positioning a surface 112 of a workpiece 110 for laser machining according to an exemplary embodiment of the present invention.

The apparatus 100 includes a laser 102 for generating a laser beam 104. In an exemplary embodiment, the laser beam 104 is an ultrashort pulse laser beam. The laser beam 104 is directed to a focusing lens 108.

In an exemplary embodiment, the laser beam 104 is directed to the focusing lens 108 by a first mirror 106. The first mirror has a high reflectivity at the wavelength of the laser beam 104 and transmits other wavelengths. The first mirror 106 may be formed using multiple layers of dielectric coatings having a high reflectivity at the wavelength of the laser beam 104.

The focusing lens 108 focuses the laser beam 104 to a focal point of heightened laser power density. In an exemplary embodiment, at this time the workpiece 110 is located at a position away from the focal region while the laser beam 104 is focused to the focal point so the workpiece 110 is not damaged by the focused laser beam 104. A plasma 130 is formed at the focal point. In an exemplary embodiment, the laser 102 provides an ultrafast laser beam 104 with a pulse duration in the picosecond or femtosecond range. The high peak intensity of the ultrafast laser, when focused, may ionize air to generate a visible plasma spark 130 in the focal region.

In an exemplary embodiment, this plasma 130 is formed at a focal point, in an atmosphere including air, in front of the surface 112 of the workpiece 110. The laser 102 may be a titanium doped sapphire laser (Ti:sapphire) having a wavelength of 800 nm, a pulse width of 150 fs, and a pulse energy of 1 mJ (peak power of $10^{-3}$ J/$150\times10^{-15}$ sec=6.7 GW), for example.

The plasma 130 generates an emission which is transmitted back through the focusing lens 108. Light from the plasma emission having wavelengths different from the wavelength of the laser beam 104 is transmitted through the first mirror 106. An imaging system is oriented to receive the light from the partial plasma emission having wavelengths different from the wavelength of the laser beam 104 and generate a plasma image.

In an exemplary embodiment, the imaging system includes a camera. In another exemplary embodiment, as shown in the FIGURE, the imaging system includes an image relay lens 114 and a camera 116. The image relay lens 114 receives the plasma emission which is transmitted through the first mirror 106 and directs the plasma emission to the camera 116. In an exemplary embodiment, the camera 116 is a two-dimensional photodetector such as a CCD camera. In an exemplary embodiment, the apparatus 100 includes a first color filter 118. The first color filter 118 may be used to narrow the spectral bandwidth of the plasma emission to help reduce chromatic aberration of the imaging system.

A controller 140 receives the plasma image from the camera 116 and determines a level of focus of the plasma image. The controller 140 then adjusts the imaging system to focus the plasma image. The plasma image may be focused by adjusting the position of the image relay lens 114 relative to the camera 116. As illustrated in the FIGURE, the controller 140 may, for example, control an imaging system actuator 134 to adjust the position of the image relay lens 114. It is contemplated, however, that the imaging system actuator 134 may be used to control the position of one or both of the image relay lens 114 and the camera 116 to adjust the focus of the plasma image at the camera 116.

The level of focus may be determined by the controller 140 using autofocus techniques. Alternatively, the plasma image generated by the camera 116 may be displayed on a video monitor (not shown) and the focus of the plasma image may be manually adjusted responsive to the clarity of the plasma image displayed on the video monitor.

Once a focused image of the plasma has been obtained, a first shutter 120 is then used to divert the laser beam 104 away from the focal point. The workpiece 110 is then moved so the workpiece surface 112 is in the vicinity of the focal point. A second shutter 124 is removed from the path of an illumination source 122 to illuminate the surface 112 of the workpiece 110. Light from the illumination source 122 may be directed to the surface 112 of the workpiece 110 through a collimating lens 126 to a second mirror 136. In an exemplary embodiment, a second color filter 128 may be used to narrow the spectral bandwidth of the light generated by the illumination source 122. The second mirror 136 has a high reflectivity at the wavelength of the illumination source 122 and transmits other wavelengths. The second mirror 136 reflects light from the illumination source 122 through the first mirror 106 to the focusing lens 108 to focus light generated by the illumination source 122 at the focal point.

Under the illumination of the illumination source 122, the camera 116 then generates an image (workpiece surface image) of the surface 112 of the workpiece 110 as described above with regard to the plasma image. Without adjusting the imaging system actuator 134, the controller 140 then controls a workpiece actuator 132 to adjust the position of the workpiece 110 relative to the focal point. The workpiece actuator 132 moves the workpiece 110 toward the focal point while an image of the surface 112 of the workpiece 110 is monitored by the controller 140. The position of the workpiece 110 is adjusted until the image of the surface 112 is in focus. When the workpiece surface image is in focus, the surface 112 of the workpiece 110 is at the focal point of the laser.

The image of the plasma 130 and the image of the surface 112 of the workpiece 110 are generated by respective emissions directed along the same optical path to the camera 116. For example, in the exemplary embodiment described with regard to the FIGURE, the respective emissions are directed through the focusing lens 108 to path 142, through the first mirror 106 to path 144, through the second mirror 136 to path 146, through the image relay lens 114 and the first color filter 118 to the camera 116. The present invention allows accurate positioning of the surface 112 of the workpiece 110 at the focal point despite abnormalities along the optical path because both emissions follow the same optical path for forming their respective images and are subject to the same optical abnormalities.

After the surface 112 of the workpiece 110 is at the focal point, the first shutter 120 may then be removed from the path of the laser beam 104 to allow the laser beam 104 to be directed to the focal point on the surface 112 of the workpiece 110.

The present invention provides a method of automatically adjusting the position of a workpiece for the surface of a workpiece to be located at the focal point of a laser beam while the laser beam is not being directed to the workpiece. This allows more precise machining by ensuring that the surface 112 of the workpiece 110 is at the focal point when the laser beam is directed to the surface 112. Otherwise, if the laser beam is directed to the focal point while the surface 112 of the workpiece 110 is being adjusted to the focal point, the laser may be machining the workpiece as the workpiece is moved back and forth.

The teachings of the present invention may be applied to adjust the position of the surface of a workpiece to the focal point without adjusting the focus of the plasma image. For example, the controller 140 may determine a level of focus of the plasma image and then adjust the position of the workpiece 110 until the surface 112 of the workpiece 110 is at the same level of focus as the plasma image.

As described above, first and second shutters 120, 124 are used to divert the laser beam 104 and light from the illumination source 122, respectively, away from the focal point. As known to those skilled in the art, other methods and apparatus may be used. For example, the laser 102 or illumination source 122 may be deactivated so they do not generate the laser beam or illumination.

In an exemplary embodiment, after the imaging system is adjusted to focus the plasma, the power of the laser beam 104 is reduced such that a plasma is no longer generated and the focused laser may not damage the workpiece. The position of the workpiece 110 may then be adjusted to focus the image of the surface 112 of the workpiece 110. This allows the teachings of the present invention to be applied to position the workpiece without an illumination source. As known to those skilled in the art, to generate a workpiece surface image without an illumination source, the wavelength of the laser beam 104 should correspond to a wavelength of light that is reflected by the first mirror 106 and that creates an emission off the surface 112 of the workpiece 110 that is detected by the camera 116.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method for positioning a surface of a workpiece for laser machining comprising the steps of:
   (a) generating a laser beam
   (b) focusing the laser beam to a focal point to form a plasma at a position above the surface of the workpiece, the plasma generating a plasma emission;
   (c) determining a position of the focal point responsive to the plasma emission; and
   (d) moving the surface of the workpiece to the position of the focal point.

2. A method according to claim 1 further comprising the step of diverting the laser beam away from the focal point before step (d).

3. A method according to claim 2 wherein the laser beam is diverted away from the focal point by one of deactivating the laser beam and deflecting the laser beam.

4. A method according to claim 1 wherein
step (c) includes the steps of:
orienting an imaging system to receive the plasma emission and generate a plasma image, and
determining a level of focus of the plasma image; and
step (d) includes the step of actuating the workpiece to the focal point responsive to the determined level of focus of the plasma image.

5. A method according to claim 1 wherein
step (c) includes the steps of:
orienting an imaging system to receive the plasma emission and generate a plasma image, and
adjusting the imaging system to focus the plasma image; and
step (d) includes the steps of:
positioning the workpiece in a position wherein an image of the surface of the workpiece is directed to the imaging system to generate a workpiece surface image, and
actuating the workpiece to focus the workpiece surface image.

6. A method according to claim 1 wherein step (a) includes generating an ultrashort pulse laser beam.

7. A method according to claim 5 wherein step (c) further includes the step of filtering the plasma emission to narrow the spectral bandwidth of the plasma image.

8. A method according to claim 5 further comprising the step of diverting the laser beam away from the focal point before step (d); and
step (d) includes the step of illuminating the surface of the workpiece.

9. A method according to claim 5 wherein the imaging system includes an image relay lens and a camera and step (c) includes adjusting the imaging system by actuating at least one of the image relay lens and the camera to focus the plasma image.

10. A method for positioning a surface of a workpiece for laser machining comprising the steps of:
(a) generating an ultrashort pulse laser beam
(b) focusing the ultrashort pulse laser beam to a focal point away from the workpiece to form a plasma generating a plasma emission;
(c) orienting an imaging system to receive an plasma image of the plasma emission;
(d) adjusting the imaging system to focus the plasma image;
(e) diverting the ultrashort pulse laser beam away from the focal point by one of deactivating the laser beam and deflecting the laser beam;
(f) positioning the workpiece in a position wherein an image of the surface of the workpiece is directed to the imaging system to generate a workpiece surface image; and
(g) actuating the workpiece to focus the workpiece surface image in the imaging system.

11. An apparatus for positioning a surface of a workpiece for laser machining comprising:
means for generating a laser beam
means for focusing the laser beam to a focal point to form a plasma at a position above the surface of the workpiece, the plasma generating a plasma emission;
means for determining a position of the focal point responsive to the plasma emission; and
means for moving the surface of the workpiece to the position of the focal point.

12. Apparatus according to claim 11 further comprising means for diverting the laser beam away from the focal point.

13. Apparatus according to claim 12 wherein the means for diverting the laser beam away from the focal point includes one of means for deactivating the laser beam and means for deflecting the laser beam.

14. Apparatus according to claim 11 wherein:
the means for determining the position of the focal point includes:
means for orienting an imaging system to receive the plasma emission and generate a plasma image, and
means for determining a level of focus of the plasma image; and
the means for moving the surface of the workpiece to the position of the focal point includes means for actuating the workpiece to the focal point responsive to the determined level of focus of the plasma image.

15. Apparatus according to claim 11 wherein:
the means for determining the position of the focal point includes:
means for orienting an imaging system to receive the plasma emission and generate a plasma image, and
means for adjusting the imaging system to focus the plasma image; and
the means for moving the surface of the workpiece to the position of the focal point includes:
means for positioning the workpiece in a position wherein an image of the surface of the workpiece is directed to the imaging system to generate a workpiece surface image, and
means for actuating the workpiece to focus the workpiece surface image.

16. Apparatus according to claim 15 wherein the plasma emission has a spectral bandwidth and the means for moving the surface of the workpiece to the position of the focal point further includes means for filtering the plasma image to narrow the spectral bandwidth of the plasma image.

17. Apparatus according to claim 15 further comprising means for diverting the laser beam away from the focal point; and
the means for moving the surface if the workpiece to the position of the focal point includes means for illuminating the surface of the workpiece.

18. Apparatus according to claim 15 wherein the imaging system includes an image relay lens and a camera and the means for moving the surface of the workpiece to the position of the focal point includes means for adjusting the imaging system by actuating at least one of the image relay lens and the camera to focus the plasma image.

19. Apparatus according to claim 11 wherein the means for generating a laser beam includes means for generating an ultrashort pulse laser beam.

20. Apparatus according to positioning a surface of a workpiece for laser machining comprising:
means for generating an ultrashort pulse laser beam
means for focusing the ultrashort pulse laser beam to a focal point above the workpiece to form a plasma generating a plasma emission;
means for orienting an imaging system to receive an image of the plasma emission;
means for adjusting the imaging system to focus the plasma image;
means for diverting the ultrashort pulse laser beam away from the focal point by one of deactivating the laser beam and deflecting the laser beam;

means for positioning the workpiece in a position wherein an image of the surface of the workpiece is directed to the imaging system to generate a workpiece surface image; and means for actuating the workpiece to focus the workpiece surface image in the imaging system.

\* \* \* \* \*